United States Patent [19]

Hwang

[11] 4,269,627
[45] May 26, 1981

[54] WATERPROOF INFRARED ABSORPTIVE JET PRINTING INK

[75] Inventor: Ki-Sup Hwang, Xenia, Ohio

[73] Assignee: The Mead Corporation, Dayton, Ohio

[21] Appl. No.: 53,618

[22] Filed: Jun. 29, 1979

[51] Int. Cl.³ .............................................. C09D 11/00
[52] U.S. Cl. ................................. 106/22; 260/29.6 H
[58] Field of Search ...................... 106/22, 23, 19, 20; 260/29.6 H; 346/104 R

[56] References Cited

U.S. PATENT DOCUMENTS

| | | | |
|---|---|---|---|
| 3,533,811 | 10/1970 | Clements et al. | 106/24 |
| 3,705,043 | 12/1972 | Zabiak | 106/22 |
| 3,846,141 | 11/1974 | Ostergren et al. | 106/22 |
| 3,870,528 | 3/1975 | Edds et al. | 106/22 |
| 3,903,034 | 9/1975 | Zabiak et al. | 260/29.6 WB |
| 3,945,837 | 3/1976 | Miyata et al. | 106/22 |
| 4,136,076 | 1/1979 | Daniels | 106/22 |

FOREIGN PATENT DOCUMENTS 1494768 12/1977 United Kingdom .

Primary Examiner—Lorenzo B. Hayes
Assistant Examiner—Amelia B. Yarbrough
Attorney, Agent, or Firm—Biebel, French & Nauman

[57] ABSTRACT

An improved infrared absorptive jet printing ink is provided. The composition includes an aqueous solution of a mixture of infrared absorptive water soluble dyestuffs, an alkaline agent which completely solubilizes the dyestuffs in water and aids in their penetration of and fixation to paper, and a humectant to prevent the composition from drying out. Optional additives include a fiber fixing agent or a water repellent agent and a defoaming agent. The ink runs well in a multi-jet printer, is smudge resistant and waterproof when dry, has a high absorptivity at infrared wavelengths, and is optically black.

8 Claims, No Drawings

WATERPROOF INFRARED ABSORPTIVE JET PRINTING INK

BACKGROUND OF THE INVENTION

This invention relates to printing inks, and more particularly to infrared absorptive printing inks suitable for use in jet drop printers and copiers.

Such printers print on a high-speed moving web by selective charging and catching of drops generated at a frequency on the order of about 50 kHz by each of the streams flowing from 500 or more orifices. These orifices have a diameter which may be less than about 2 mils, and in some instances less than 1 mil, which requires that the printing ink be free of anything but the very smallest particulate matter. Generally speaking the ink must be operable after filtering through a 1.2 micron filter and preferably should be able to undergo filtering through a 0.54 micron filter.

Further, for use in such a jet drop printer the ink must be electrically conductive, having a resistivity below about 1000 ohm cm and preferably below about 500 ohm cm. For good runnability through small orifices the ink should have a viscosity in the range between about 1 to 10 centipoise at 25° C. Over and above this the ink must be stable over a long period of time, compatible with the materials comprising the orifice plate and ink manifold, free of living organism, and functional after printing. The required functional characteristics after printing are: sufficient light absorptivity at infrared wave lengths, smear and fade resistance after printing, fast drying on paper (i.e., less than one second), and waterproof when dry.

It will be appreciated that it is quite difficult to provide an ink which performs as required after printing and yet is suitable for use in such an ink jet printer. Generally speaking, water base inks have been found to be most suitable for use in such printers because of their conductivity and viscosity range, but heretofore there has been no such ink having fully satisfactory smudge-resisting, drying and waterproof characteristics. Moreover, the above problems, which exist for jet printing inks of all colors, are particularly severe when the ink is required to rpint characters which are readable by OCR readers operating in the infrared range of about 7,000–11,000 Angstroms.

For many applications calling for infrared absorptive jet printing ink there is a concomitant requirement that the jet printed images be readable to the human eye. Generally speaking, human beings are accustomed to reading black printing, and it is therefore highly desirable that infrared absorptive jet printing inks be visually "black" as well as infrared absorbing. Accordingly, prior art jet printing inks have avoided certain green dyes known to have infrared absorbing characteristics and generally have utilized water soluble nigrosine black dyes.

Typical prior art jet printing inks using nigrosine dye as an infrared absorbing agent are disclosed in Zabiak, U.S. Pat. No. 3,705,043, and in Edds, U.S. Pat. No. 3,870,528. While nirgosine is quite black to the eye and is a good infrared absorber, it tends to agglomerate and is difficult to maintain in suspension for extended periods of time. Additionally, the images printed on paper substrates by these inks are not waterproof and tend to bleed and smear if placed in contact with moisture. Moreover, the family of nigrosine dyes may break down into compounds having carcinogenic properties if contacted by chemical reducing agents used to clean ink jet systems.

Accordingly, the need exists in the art for an infrared absorbing ink which is machine and human readable, fast drying on paper, smudge and smear resistant, and waterproof when dry.

SUMMARY OF THE INVENTION

The composition of the present invention fills that need by providing an improved infrared absorbing jet printing ink suitable for use in multijet printers and copiers. The aqueous base ink composition comprises a combination of infrared absorbing dyes, an alkaline agent which renders the dyes soluble in water and aids the water resistance of the composition when dry, and a humectant to prevent drying out and crystallization of the dyes in ink jet orifices. The ink composition may also include a fiber fixing agent or a water repellent agent which aids in producing a waterproof, permanent image when printed and an effective amount of a defoaming agent. The ink has a viscosity of between 1 and 10 centipoise at 25° C., a resistivity below 500 ohm cm, and easily passes through a 1.2 micron filter.

As the dye component, it has been found that Direct Black 19 (C.I. 35255) and Direct Black 22 (C.I. 35435) dyes exhibit both infrared absorptive properties and water resistance after drying. When either of these dyes is combined with solubilized Sulfur Black 1 (C.I. 53186) dye, the resultant ink is easily readable by optical character readers operating in the range of from 7,000 to 11,000 Angstroms as well as appearing visually black to human eyes. The combination of dyes is completely soluble in alkaline aqueous solutions.

The alkaline agents used in the composition of the present invention are soluble in water and have the general formulas $R_3N$ or $R_2NH$, where R can be either a lower alkyl or aryl group. Examples of suitable alkaline agents include tetrahydro-1,4-oxazine, diethanolamine, tris (hydroxyethyl) amine, and methylamine. These agents not only aid in solubilizing the dyes in water but also aid in penetration of the ink into paper.

Although the combination of dyes and alkaline agent results in an ink composition which is fast drying and water resistant when dry, other components may be added to the composition to enhance its properties. These include a fiber fixing agent such as homopolymer of acrylic acid or a lower alkyl acrylic acid which is soluble in an alkaline aqueous solution but insoluble when dry, a water repellent agent such as a vinyl emulsion of pentaerythritol, dicyandiamide, and monosodium phosphate, a humectant such as lower alkyl glycols, and a defoaming agent such as a silicone base composition.

Accordingly, it is an object of the present invention to provide a novel and improved printing ink suitable for use in jet drop printers and copiers which is readable by optical character readers operating in the infrared range, fast drying on paper, smudge and smear resistant, and waterproof when dry. This and other objects and advantages of the invention will become apparent from the following description and appended claims.

DESCRIPTION OF THE PREFERRED EMBODIMENTS

The basic components of the jet printing ink of the present invention are: (a) a combination of infrared absorbing dyes which are soluble in an alkaline aqueous solution (b) an alkaline agent which both solubilizes the dyes and aids in their penetration of and fixation to paper, (c) a humectant to prevent the composition from drying out, and (d) a water base. Additional desirable ingredients are: (e) a fiber fixing or water repellent agent, and (f) a deforming agent.

It has been found that jet printing inks formulated according to this invention exhibit all of the required properties of a good jet drop printing ink. The ink is both human and machine readable, the viscosity of the ink is betwen 1.0 and 10 centipoise, and its resistivity is less than about 500 ohm cm. The ink is free of particulate matter greater than 2 microns in diameter and has no tendency to agglomerate during storage. The pH of the ink is adjusted to be slightly alkaline, and it is compatible with the materials it comes into contact with during operation including piping, the ink supply tank and manifold, and the orifice plate. Although the ink will remain stable in storage and will not dry out for extended time periods, once printed onto paper it will dry in less than one second. After drying the ink is smear, smudge, and light resistant as well as waterproof.

For the dye component of the invention, it has been discovered that Direct Black 19 (C.I. 35255) and Direct Black 22 (C.I. 35435) dye absorb radiation in the infrared range of 7,000 to 11,000 Angstroms. As reported in the Color Index, published by the Society of Dyes and Colorists in cooperation with the American Association of Textile Chemists and Colorists, the structure of Direct Black 19 is:

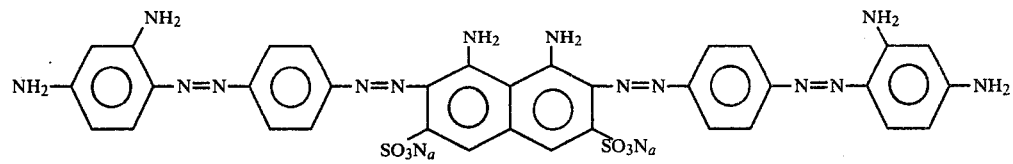

The structure of Direct Black 22 is

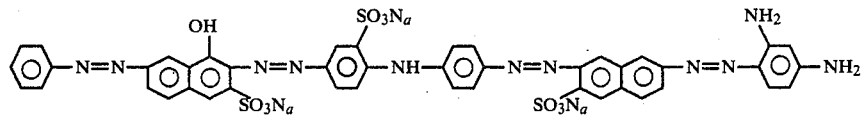

Both of these dyes are readily soluble in alkaline aqueous solutions and contain no particulate matter which could clog ink jet orifices. Concentrations of these dyes in the overall composition should be in the range of from 0.5 to 5.0% by weight, and preferably 1.0 to 3.0%.

In combination with either or both of these direct dyes, is a second infrared absorbing dye which is also water soluble. The preferred dye is solubilized Sulfur Black 1 (C.I. 53186) reported by the Color Index to be the thiosulfonic acid of 2, 4-dinitrophenol. The concentration of this dye in the overall composition should be between about 0.5 and 5.0% by weight, and preferably 1.0 to 3.0%. Sulfur Black 1 % is commercially available from American Cyanamid Company under the name Calco Soluble R and Martin-Marietta Company under the name Sodyco Paper Black. This dye is further described in my co-pending application Ser. No. 791,380 filed Apr. 27, 1977.

Although inorganic alkaline agents such as sodium or potassium hydroxide can serve to elevate the pH of the composition, it has been found that amines having the general formulas $R_3N$ or $R_2NH$, where R represents a lower alkyl or aryl group, not only act as alkalizing agents but also serve to aid in the penetration of the ink into paper and in the water resistance of the ink upon drying. It is believed that hydrogen or methoxy group bonding of the alkalizing agent to the dye compounds on paper may be, in part, responsible for the resistance to water. Examples of compounds found to be suitable for this purpose include tetrahydro-1,4-oxazine, diethanolamine, tris (hydroxy methyl) amine, and methylamine. The exact amount of alkalizing agent utilized is not critical but it should be an amount sufficient to raise the pH of the ink composition to between about 8 and 10. About 0.5-5.0% by weight, and preferably about 1.0-3.0%, of alkalizing agent has produced good results.

In order to improve the water resistant properties of the ink, a fiber fixing or water repellent agent may be added to the composition. Examples of such a fiber fixing agent are homopolymers of acrylic acid or lower alkyl acrylic acid which are soluble in alkaline aqueous solutions but become insoluble solids when dry. Thus, when mixed with the composition of the present invention, such polymers will harden into a water-resistant film when printed and tend to fix the ink onto the paper. An acrylic polymer suitble for use in this invention is comercially available from the Morton Chemical Company under the name Lucidene 303 which is a mixture of 65% acrylic polymer dissolved in 35% isopropanol. Amounts of from 2-7% by weight may be used in the ink composition, and preferably 3-5%.

Alternatively, a water repellant agent may be added

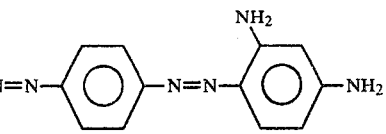

to the ink to improve the resistance to water of the composition. For example, Latex 744B, which is commercially available from the Dow Chemical Company, may be added in an amount from about 0.5-3.0% by weight, and preferably about 1.0-2.0% to the ink composition. Latex 744B is believed to be a vinyl in water emulsion which contains pentaerythritol, dicyanamide, and monosodium phosphate.

Because of the importance of preventing the drying out of a jet drop printing ink formulation, a humectant should also be added to the composition. However, addition of some prior art humectants such as polyethylene glycols and other high molecular weight compounds are not compatible with the composition of the present invention because they result in the precipitation of some components out of solution. It has been found that water soluble lower alkylene glycols such as ethylene glycol, diethylene glycol, triethylene glycol, and propylene glycol are suitable for use in preventing the composition of the present invention from drying out. They may be added to the composition in an amount ranging from 4.0–10%.

If foaming problems occur during use of the ink composition of the present invention, a small amount of a defoaming agent may be added to alleviate the problem. However, the defoamig agent must be dispersible in an aqueous solution to the extent that it will pass through a 1.2 micron filter through which the ink is filtered prior to use. Additionally, the defoaming agent should resist any tendency to congeal or agglomerate and must have a sufficient spreadig power to dissipate any foam. It has been found that a combination of defoaming agents avaiable from Sandoz Company and Diamond Shamrock Corp. under the names Antimussol JK and Nopco NXZ, respectively, satisfy the above requirements. Both compsoitions are believed to be silicone based. To overcome any tendency of the agents to coagulate, they should be mixed with water and heated to 60° C. prior to mixing with the ink composition. Good results have been achieved by adding about 0.05% by weight of each defoaming agent to the overall ink composition.

The following nonlimitative examples are offered to illustrate the practice of the present invention, with all percentages being given by weight.

EXAMPLE I

Direct Black 19: 3.0%
Sodium hydroxide: 0.1
Water: 96.9

The ink formulation above exhibited a very good range of properties desirable for a jet printing ink including a viscosity of 1.01 centipoise, a pH of 9.5, a surface tension of 56 dyne/cm, and a resistivity of 98 ohm cm. The ink was particulate free and could pass through a 0.4 micron filter.

However, the image drawn by the ink appeared only weakly water resistant.

EXAMPLE II

Tetrahydro-1,4-oxazine: 2.0%
Direct Black 19: 3.0
Solubilized Sulfur Black 1: 1.0
Water: 94.0

The above ink formulation, with tetrahydro-1,4-oxazine substituted as the alkaline agent, again exhibited a good range of desirable properties. The image printed with the ink was measured by an optical character reader test unit (Moore Model 082A), and a print contrast signal (PCS) value of 0.85 was measured when the image was exposed to infrared radiation. This value is well above the 0.75 PCS value required for operation of commercial scanners operating in the infrared region. The image printed showed good resistance to water with only slight bleeding upon application of water.

EXAMPLE III

Tetrahydro-1,4-oxazine: 2.0%
Lucidene 303: 4.0
Ethylene glycol: 5.0
Direct Black 19: 3.0
Solubilized Sulfur Black 1: 1.0
Deionized water: balance The above ink formulation mixes together well with agitation and has a viscosity of 1.75 centipoise and a resistivity of 102 ohm cm. The image was waterproof and had a PCS value above 0.75 for the infrared scanning range.

EXAMPLE IV

Tetrahydro-1,4-oxazine: 2.0%
Latex 744B: 1.5
Ethylene glycol: 5.0
Direct Black 19: 3.0
Solubilized Sulfur Black 1: 1.0
Deionized water: balance The above ink formulation, with Latex 744B substituted for Lucidene 303, also exhibited a good range of properties and had a viscosity of 1.4 centipoise. The image printed with the ink was waterproof and exhibited a PCS value about 0.75 for the infrared scanning range.

EXAMPLE V

To the ink formulation of Example III, 0.05% Antimussol JK and 0.05% Nopco NXZ were added as defoaming agents. The agents were initially mixed with water and heated to 60° C. prior to their addition to the ink formulation. The ink contained no particulate matter and could pass through a 0.8 micron filter. The ink exhibited the same properties as reported in Example III, and ther was no foaming problem during printing.

While the compositions and method herein described constitute preferred embodiments of the invention, it is to be understood that the invention is not limited to these precise compositions and methods, and that changes may be made in either without departing from the scope of the invention, which is defined in the appended claims.

What is claimed is:

1. A jet printing ink which has high light absorptivity at infrared wavelengths and smear resistance after printing, is fast drying on paper and waterproof when dry comprising:
   (a) as the dye component, a first water soluble dyestuff selected from the group consisting of Direct Black 19, Direct Black 22, and mixtures thereof; and a second water soluble dyestuff which is the thiosulfonic acid of 2,4-dinitrophenol;
   (b) an alkaline agent which solubilizes the dye component and aids in its penetration of and fixation to paper comprising a compound having the formula $R_3N$, wherein R is a lower alkyl group, an aryl group, or hydrogen, with the proviso that not more than one R group can be hdyrogen;
   (c) a humectant selected from the group consisting of water soluble lower alkylene glycols; and
   (d) the balance water,
   said formulation also having a resistivity below about 1000 ohm cm and a viscosity of 1–10 centipoise at 25° C.

2. The jet printing ink of claim 1, further including a fiber fixing agent selected from the group consisting of homopolymers of acrylic acid and lower alkyl acrylic acid.

3. The jet printing ink of claim 1 in which said alkaline agent is tetrahydro-1,4-oxazine.

4. The jet printing ink of claim 1 in which said first and second water soluble dyestuffs are both present in an amount of between about 0.5 and 5.0% by weight, respectively.

5. The jet printing ink of claim 4 in which said alkaline agent is present in an amount of between about 0.5 and 5.0% by weight.

6. A jet printing ink which has high light absorptivity at infrared wavelengths and smear resistance after printing, is fast drying on paper and water resistant when dry comprising:

about 0.5 to 5.0% by weight of a first water soluble dyestuff selected from the group consisting of Direct Black 19 and Direct Black 22;

about 0.5 to 5.0% by weight of the thiosulfonic acid of 2,4-dinitrophenol;

about 0.5 to 5.0% by weight of an alkaline agent having the formula $R_3N$, where R is a lower alkyl group, an aryl group, or hydrogen, with the proviso that no more than one R group can be hydrogen;

about 4.0 to 10.0% by weight of a humectant selected from the group consisting of water soluble lower alkylene glycols; and the balance water.

7. The jet printing ink of claim 6 comprising:

about 3.0% by weight Direct Black 19;

about 1.0% by weight of the thiosulfonic acid of 2,4-dinitrophenol;

about 2.0% by weight tetrahydro-1,4-oxazine as the alkaline agent;

about 5.0% ethylene glycol; and the balance water.

8. The jet printing ink of claim 7 further including about 4.0% by weight of a homopolymer of acrylic acid or a lower alkyl acrylic acid.

* * * * *

UNITED STATES PATENT AND TRADEMARK OFFICE
CERTIFICATE OF CORRECTION

PATENT NO. : 4,269,627
DATED : May 26, 1981
INVENTOR(S) : Ki-Sup Hwang and Timothy F. Burneka It is certified that error appears in the above-identified patent and that said Letters Patent are hereby corrected as shown below:

On the face of the patent, the joint inventors are:

[75] Inventors: Ki-Sup Hwang, Xenia, Ohio
Timothy F. Burneka, Plano, Texas

Signed and Sealed this

Nineteenth Day of April 1982

[SEAL]

Attest:

GERALD J. MOSSINGHOFF

Attesting Officer

Commissioner of Patents and Trademarks